United States Patent
Church et al.

(10) Patent No.: US 10,772,112 B2
(45) Date of Patent: Sep. 8, 2020

(54) NETWORK NEIGHBORHOOD ALIGNMENT

(71) Applicant: QUALCOMM Incorporated, San Diego, CA (US)

(72) Inventors: Christopher Church, Cambridge (GB); Mayank Batra, Cambridge (GB); Laurence Richardson, Near Ely (GB); Jonathan Tanner, Sidmouth (GB); Magnus Sommansson, Veberod (SE); Robin Heydon, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 50 days.

(21) Appl. No.: 16/219,526

(22) Filed: Dec. 13, 2018

(65) Prior Publication Data

US 2020/0196323 A1 Jun. 18, 2020

(51) Int. Cl.
*H04W 72/12* (2009.01)
*H04W 40/24* (2009.01)
*H04W 4/80* (2018.01)
*H04W 24/08* (2009.01)
*H04W 88/04* (2009.01)

(52) U.S. Cl.
CPC ........... *H04W 72/121* (2013.01); *H04W 4/80* (2018.02); *H04W 24/08* (2013.01); *H04W 40/248* (2013.01); *H04W 72/1278* (2013.01); *H04W 88/04* (2013.01)

(58) Field of Classification Search
None
See application file for complete search history.

(56) References Cited

U.S. PATENT DOCUMENTS

| | | | | |
|---|---|---|---|---|
| 2004/0228281 A1* | 11/2004 | Rakotoarivelo | .. | H04W 72/1236 370/252 |
| 2005/0185669 A1* | 8/2005 | Welborn | ............... | H04W 48/18 370/465 |
| 2009/0059855 A1* | 3/2009 | Nanda | ............... | H04W 72/1278 370/329 |

* cited by examiner

*Primary Examiner* — Alex Skripnikov
(74) *Attorney, Agent, or Firm* — Holland & Hart LLP/Qualcomm

(57) ABSTRACT

Generally, the described techniques provide for transmission schedule coordination, and in some cases transmission schedule modification, for time division multiple access (TDMA) links amongst devices engaged in communications. A network neighborhood alignment (NNA) protocol may allow devices to inform peer devices of current (e.g., established) connections within the network neighborhood (e.g., of TDMA links established between the device and peer devices, or of TDMA links established between other per devices that are known to the device). Devices may also communicate desired connection preferences, requests for peer device current connection information (e.g., the types of data being transferred by a peer device, the connection type of links associated with the peer device), etc. In some examples, the NNA protocol may establish the information exchange via a dedicated network neighborhood channel (NNC) or via point-to-point messages exchanged between devices (e.g., where the information may then be relayed amongst peer devices).

17 Claims, 8 Drawing Sheets

NETWORK NEIGHBORHOOD ALIGNMENT

BACKGROUND

The following relates generally to wireless communications, and more specifically to network neighborhood alignment.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (i.e., Institute of Electrical and Electronics Engineers (IEEE) 802.11) network, may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). Further, a wireless personal area network (PAN), which may include a Bluetooth connection, may provide for short range wireless connections between two or more paired wireless devices. For example, wireless devices may utilize wireless PAN communications to exchange information such as audio signals with wireless headsets.

SUMMARY

The described techniques relate to improved methods, systems, devices, or apparatuses that support network neighborhood alignment (NNA). Generally, the described techniques provide for transmission schedule coordination, and in some cases transmission schedule modification, for time division multiple access (TDMA) links amongst peer devices. Some short-range wireless communication systems may utilize TDMA protocols where a master device manages pertinent parameters of a TDMA link between two devices (e.g., between a master device and a slave device). A TDMA link may be associated with both master transmit/slave receive instances and master receive/slave transmit instances. If one of the devices is taking part in an additional TDMA link with a third device, however, scheduling issues may occur between the two TDMA links (e.g., communications over the links may interfere, or the respective network bandwidth as a function of time may be unavailable for use in additional links). Such may lead to inefficient bandwidth utilization (e.g., reducing the number of users that may utilize system resources) or, in some cases, negative user experience from link interference or dropped links. Improved protocols and techniques are desired.

A NNA protocol may allow devices to inform peer devices of current (e.g., established) connections (e.g., of TDMA links established between the device and peer devices, or of TDMA links established between other peer devices that are known to the device). Devices may also communicate future (e.g., desired) connection preferences, requests for peer device current connection information (e.g., the types of data being transferred by a peer device, the connection type of links associated with the peer device), etc.

In some examples, the NNA protocol may establish the information exchange via a dedicated network neighborhood channel (NNC). The NNC may include entries (e.g., each entry corresponding to a calculated timebase or fundamental 'tick' of the TDMA system) for peer devices to add their respective TDMA link information into. Devices may thus add their link information into the NNC with a seed timebase based upon the current known links in which the seeding device participates. Devices may further communicate the presence of the NNC, and peer devices may periodically synchronize to the NNC (e.g., to check whether other peer devices have conflicting connection commitments). In other examples, the NNA protocol may establish information exchange via point-to-point messages exchanged between devices (e.g., where the link scheduling information may then be relayed amongst peer devices) or via broadcast messages from peer devices.

As such, devices may exchange scheduling information (e.g., according to the NNA protocol) to facilitate coordinated transmission scheduling of various TDMA links amongst peer devices. Scheduling information may include current (e.g., ongoing) connection commitments, types of data being transferred, connection types (e.g., such as basic rate (BR)/enhanced data rate (EDR) or Bluetooth Low Energy (BLE) connections), future (e.g., desired) connection preferences, etc. In some cases, requests for such scheduling information from other peer devices may be communicated. Devices may thus convey context of current connections (e.g., such as what links are established, link properties associated with established links, etc.), as well as requests for future connections. Therefore, devices may efficiently identify or determine coordinated transmission schedules.

A method of wireless communication at a first wireless device is described. The method may include receiving scheduling information for a first time division multiple access link between a second wireless device and a third wireless device, and identifying, based on the scheduling information for the first time division multiple access link, a coordinated transmission schedule. The coordinated transmission schedule may include transmission scheduling information for the first time division multiple access link and for a second time division multiple access link between the first wireless device and another wireless device. The method may further include modifying (e.g., and in some cases establishing) the second time division multiple access link between the first wireless device and the another wireless device based on the coordinated transmission schedule.

An apparatus for wireless communication at a first wireless device is described. The apparatus may include a processor, memory in electronic communication with the processor, and instructions stored in the memory. The instructions may be executable by the processor to cause the apparatus to receive scheduling information for a first time division multiple access link between a second wireless device and a third wireless device, identify, based on the scheduling information for the first time division multiple access link, a coordinated transmission schedule that includes transmission scheduling information for the first time division multiple access link and a second time division multiple access link between the first wireless and another wireless device, and modify the second time division multiple access link between the first wireless and the another wireless device based on the coordinated transmission schedule.

Another apparatus for wireless communication at a first wireless device is described. The apparatus may include means for receiving scheduling information for a first time division multiple access link between a second wireless device and a third wireless device, identifying, based on the scheduling information for the first time division multiple access link, a coordinated transmission schedule that includes transmission scheduling information for the first time division multiple access link and a second time division multiple access link between the first wireless and another wireless device, and modifying the second time division multiple access link between the first wireless and the another wireless device based on the coordinated transmission schedule.

A non-transitory computer-readable medium storing code for wireless communication at a first wireless device is described. The code may include instructions executable by a processor to receive scheduling information for a first time division multiple access link between a second wireless device and a third wireless device, identify, based on the scheduling information for the first time division multiple access link, a coordinated transmission schedule that includes transmission scheduling information for the first time division multiple access link and a second time division multiple access link between the first wireless device and another wireless device, and modify the second time division multiple access link between the first wireless device and the another wireless device based on the coordinated transmission schedule.

Some examples of the method, apparatuses, and non-transitory computer-readable medium described herein may further include operations, features, means, or instructions for establishing a third time division multiple access link between the first wireless device and a fourth wireless device based on the coordinated transmission schedule. In some examples of the method, apparatuses, and non-transitory computer-readable medium described herein, the coordinated transmission schedule may be identified based on a connection preference for the third time division multiple access link.

Some examples of the method, apparatuses, and non-transitory computer-readable medium described herein may further include operations, features, means, or instructions for identifying one or more link properties associated with the first time division multiple access link, the second time division multiple access link, or both, where the coordinated transmission schedule may be identified based on the one or more link properties. In some examples of the method, apparatuses, and non-transitory computer-readable medium described herein, the one or more link properties include a synchronous link property, an asynchronous link property, an isochronous link property, a quality of service requirement, or some combination thereof, associated with the first time division multiple access link, or the second time division multiple access, or both.

Some examples of the method, apparatuses, and non-transitory computer-readable medium described herein may further include operations, features, means, or instructions for monitoring a network neighborhood channel, where the scheduling information may be received based on the monitoring. Some examples of the method, apparatuses, and non-transitory computer-readable medium described herein may further include operations, features, means, or instructions for advertising scheduling information for the first time division multiple access link, scheduling information for the second time division multiple access link, the coordinated transmission schedule, or some combination thereof, during an entry of the network neighborhood channel.

In some examples of the method, apparatuses, and non-transitory computer-readable medium described herein, receiving the scheduling information may include operations, features, means, or instructions for receiving the scheduling information from the second wireless device. Some examples of the method, apparatuses, and non-transitory computer-readable medium described herein may further include operations, features, means, or instructions for identifying one or more communication periods associated with the first time division multiple access link, the second time division multiple access link, or both, and identifying a scheduling conflict based on the one or more communication periods, where the coordinated transmission schedule may be identified based on the identified scheduling conflict.

Some examples of the method, apparatuses, and non-transitory computer-readable medium described herein may further include operations, features, means, or instructions for transmitting the scheduling information for the first time division multiple access link, scheduling information for the second time division multiple access link, the coordinated transmission schedule, or some combination thereof, to a fourth wireless device. In some examples of the method, apparatuses, and non-transitory computer-readable medium described herein, the another wireless device includes the second wireless device. In some examples of the method, apparatuses, and non-transitory computer-readable medium described herein, the another wireless device includes a fourth wireless device.

Some examples of the method, apparatuses, and non-transitory computer-readable medium described herein may further include operations, features, means, or instructions for identifying clock information associated with the second wireless device and the third wireless device, and identifying a network neighborhood channel timebase based on the clock information, where the coordinated transmission schedule may be based on the network neighborhood channel timebase. In some examples of the method, apparatuses, and non-transitory computer-readable medium described herein, the coordinated transmission schedule may be identified based on a connection preference for the modified second time division multiple access link.

DETAILED DESCRIPTION

Figure 1:
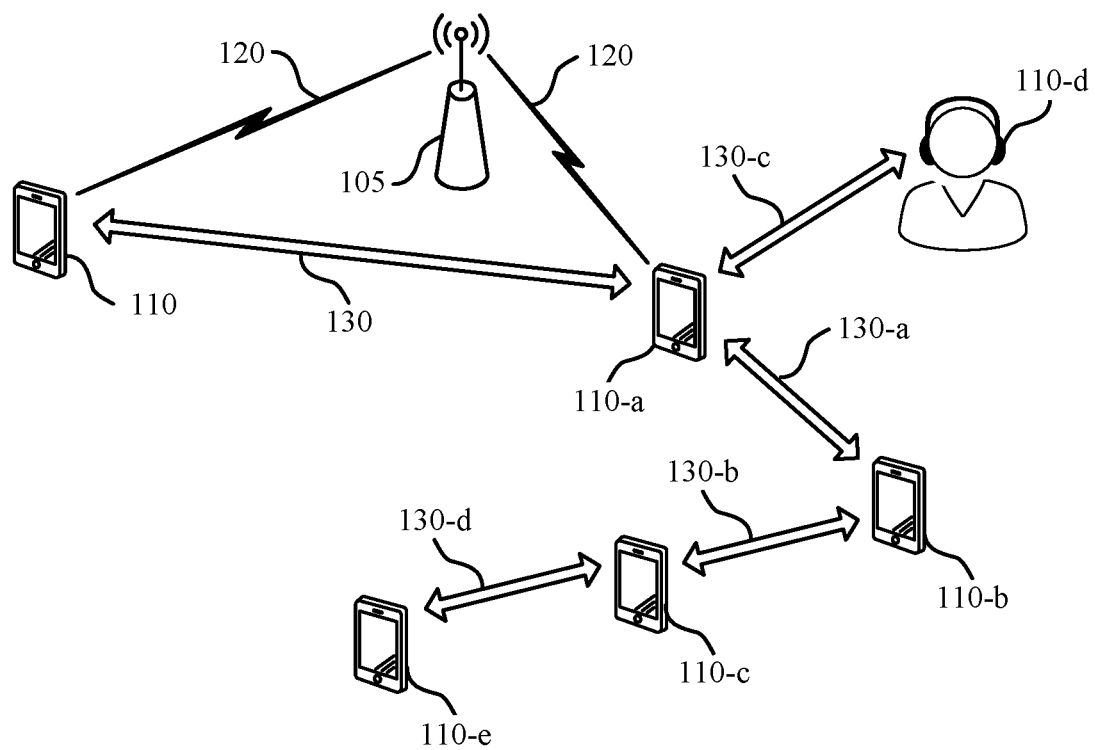
FIG. 1 illustrates an example of a system for wireless communications that supports network neighborhood alignment in accordance with aspects of the present disclosure.

Time division multiple access (TDMA) protocols may be implemented in short-range wireless communications (e.g., Bluetooth basic rate (BR)/enhanced data rate (EDR), Bluetooth Low Energy (BLE)), where a master device manages pertinent parameters of a TDMA link between two devices (e.g., between a master device and a slave device). The TDMA link may be associated with both master-transmit/slave-receive instances and master-receive/slave-transmit instances. However, if one of the devices is communicating via an additional TDMA link with a third device, scheduling issues may occur between the two TDMA links.

For example, in cases where communication occasions (e.g., transmit instances) associated with the two links overlap, the communications over the two links may interfere. Otherwise, the respective network bandwidth as a function of time may be unavailable for use in additional links (e.g., a link may be associated with an allocated time resource, even if there are inactive periods within the time duration). Such may lead to inefficient bandwidth utilization (e.g., reducing the number of users that may utilize system resources) or, in some cases, negative user experience from link interference or dropped links. That is, lack of transmission schedule coordination between TDMA links (e.g., amongst peer devices) may result in interfering links, inefficient network bandwidth utilization, etc.

The described techniques provide for transmission schedule negotiation and/or transmission schedule coordination among peer devices (e.g., amongst devices participating in short-range communications via TDMA links). A network neighborhood alignment (NNA) protocol may provide for negotiation and coordination of intervals and time periods for devices to communicate via their respective communication links. Devices may inform each other of their commitments (e.g., their scheduled links), known information about other devices (e.g., known commitments of other devices), etc. Devices may also request information from other devices. In some cases, devices may also indicate future (e.g., desired) link scheduling information. Such scheduling information may be used by devices to identify a coordinated transmission schedule. For example, devices may identify communication occasions (e.g., master-transmit/slave-receive instances and master-receive/slave-transmit instances) associated with neighboring links (e.g., TDMA links between peer devices), and may modify or establish any additional links such that system time resources are efficiently utilized.

In some cases, transmission schedule coordination or transmission schedule negotiation may be based on link properties associated with established links and future or desired links. For example, scheduling information associated with a link may include timing information associated with the link as well as link properties associated with the link. Link property information may indicate types of data being transferred, connection types (e.g., such as BR/EDR or BLE connections), a synchronous link property, an asynchronous link property, an isochronous link property, a quality of service requirement, etc. Link properties associated with established links and desired links may be considered in transmission schedule coordination, as some links may be efficiently modified than others.

For example, an established audio link may have fixed intervals and may not be as suitable for link modification (e.g., as an audio data transfer type may be more difficult to modify/buffer). As such, other links (e.g., with more flexible link properties) may be more suitable candidates for modification when determining the coordinated transmission schedule. In general, link properties (e.g., synchronous properties, asynchronous properties, isochronous properties) of various links may provide context as to how devices may more efficiently negotiate and coordinate a transmission schedule.

In some cases, scheduling information (e.g., instant timing information, link properties) and scheduling information requests may be communicated via a dedicated network neighborhood channel (NNC). The NNC may include entries (e.g., each entry corresponding to a calculated timebase or fundamental 'tick' of the TDMA system) for peer devices to add their respective TDMA link information into. Devices may thus add their link information into the NNC with a seed timebase based upon the current known links in which the seeding device participates. Devices may further communicate the presence of the NNC, and peer devices may periodically synchronize to the NNC (e.g., to check whether other peer devices have conflicting connection commitments).

In other examples, a NNA protocol may establish information exchange via point-to-point messages exchanged between devices (e.g., where the information may be relayed amongst peer devices) or via broadcast messages from peer devices. Such messages may allow a device to notify other peer devices of the presence of unrelated communications links (e.g., links associated with the network neighborhood that the receiving peer device may not be a participant of) which could benefit from alignment.

As such, devices may exchange scheduling information (e.g., according to the NNA protocol via a NNC, via point-to-point messages, via broadcast messages) to facilitate coordinated transmission scheduling of various TDMA links amongst peer devices. Scheduling information may include current (e.g., ongoing) connection commitments (e.g., transmit instances associated with current connections), types of data being transferred, connection types (e.g., such as BR/EDR or BLE connections), future (e.g., desired) connection preferences, etc. Further, devices may exchange some or all of pertinent scheduling information known to the device (e.g., scheduling information associated with the device's links as well as known scheduling information associated with unrelated links).

In some cases, requests for such scheduling information from other peer devices may be communicated. Devices may thus convey context of current connections (e.g., such as what links are established, link properties associated with established links, etc.), as well as requests for future connections. Coordinated transmission sequences and respective hopping sequences may thus be realized such that the available bandwidth in the network neighborhood is more efficiently utilized, providing improved user experience for a greater number of users in the network. Further, such coordination and negotiation may reduce pathological timing clashes, improving degradation (e.g., due to clashes or interference) sensitive communications.

For example, a device may receive scheduling information (e.g., via synchronization to the NNC, or via point-to-point messages from peer devices). In some cases, the device may additionally consider link properties associated with the device's own links (e.g., the device's established links, the device's desired links) as well as link properties associated with links established by peer devices (e.g., identified via scheduling information). The device may then identify a coordinated transmission schedule based on the received scheduling information. In some cases, the device may modify a link between the device and another device based on the identified coordinated transmission schedule (e.g., the device may modify transmit instances associated with the link). In some cases (e.g., due to more efficiently modifiable link properties associated with an unrelated link between two peer devices), the device may request link modification by a peer device (e.g., the device may transmit known scheduling information or the identified coordinated transmission schedule to the peer device).

Aspects of the disclosure are initially described in the context of a wireless communications system. Example transmission schedules and examples of transmission schedule coordination) in alignment with the described techniques are then discussed. Aspects of the disclosure are further illustrated by and described with reference to apparatus diagrams, system diagrams, and flowcharts that relate to network neighborhood alignment FIG. 1 illustrates a system 100 (e.g., which may include or refer to a wireless personal area network (PAN), a wireless local area network (WLAN), a Wi-Fi network, a network neighborhood) configured in accordance with various aspects of the present disclosure. The system 100 may include an AP 105 and devices 110 implementing WLAN communications (e.g., Wi-Fi communications) and/or Bluetooth communications. For example, devices 110 may include cell phones, mobile stations, personal digital assistant (PDAs), other handheld devices, netbooks, notebook computers, tablet computers, laptops, or some other suitable terminology. In some cases, a device 110 may include a Bluetooth device capable of pairing with other Bluetooth devices, which may include wireless headsets, speakers, ear pieces, headphones, display devices (e.g., TVs, computer monitors), microphones, meters, valves, etc. The system 100 may include APs 105 of different types (e.g., metropolitan area, home network, etc.), with varying and overlapping coverage areas.

A device 110 may communicate with an associated AP 105 over wireless link 120 via downlink (e.g., the communication link from the AP to the device) and uplink (e.g., the communication link from the device to the AP). Devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within system 100. Further, two devices 110 may communicate directly via a direct wireless link 130. Examples of direct wireless links 130 may include Bluetooth links, Wi-Fi Direct connections, Wi-Fi Tunneled Direct Link Setup (TDLS) links, etc. In some examples, a device 110 may be a part of a wireless personal area network (PAN), which may include a Bluetooth connection. The PAN may provide for short range wireless connections between two or more paired wireless devices 110. For example, a device 110 may utilize wireless PAN communications to exchange information with other devices 110 (e.g., such as audio signals with wireless headsets).

Bluetooth communications may refer to a short-range communication protocol and may be used to connect and exchange information between paired devices 110 (e.g., between mobile phones, computers, digital cameras, wireless headsets, speakers, keyboards, mice or other input peripherals, and similar devices). Bluetooth systems (e.g., aspects of system 100) may be organized using a master-slave relationship employing a time division duplex protocol having, for example, defined time slots of 625 mu secs, in which transmission alternates between the master device (e.g., device 110-a) and one or more slave devices (e.g., paired device 110-d). As such, in some cases, a device 110 may be referred to as either a master device or a slave device based on the Bluetooth role configuration of the device 110. That is, designation of a device 110 as a paired device, a master device, a slave device, etc. may not necessarily indicate a distinction in device capability, but rather may refer to or indicate roles held by the device 110 in the PAN. Generally, device 110 may refer to a wireless communication device capable of wirelessly exchanging data signals with another device (e.g., using Bluetooth communication protocols).

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., device 110-a) implements an audio source device (SRC) role and another device (e.g., paired device 110-d) implements an audio sink device (SNK) role.

For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth speakers) must be within radio range of a device implementing the SRC role (e.g., a stereo music player).

The Bluetooth specification defines a layered data transport architecture and various protocols and procedures to handle data communicated between two devices that implement a particular profile use case. For example, various logical links are available to support different application data transport requirements, with each logical link associated with a logical transport having certain characteristics (e.g., flow control, acknowledgement/repeat mechanisms, sequence numbering, scheduling behavior, etc.). The Bluetooth protocol stack is split in two parts: a "controller stack" containing the timing critical radio interface, and a "host stack" dealing with high level data. The controller stack is generally implemented in a low cost silicon device containing the Bluetooth radio and a microprocessor. The controller stack may be responsible for setting up links 130 such as asynchronous connection-less (ACL) links, synchronous connection orientated (SCO) links, etc. Further, the controller stack may implement link management protocol (LMP) functions, low energy link layer (LE LL) functions, etc. The host stack is generally implemented as part of an operating system, or as an installable package on top of an operating system. The host stack may be responsible for logical link control and adaptation protocol (L2CAP) functions, Bluetooth network encapsulation protocol (BNEP) functions, service discovery protocol (SDP) functions, etc. In some cases, the controller stack and the host stack may communicate via a host controller interface (HCI). In other cases, (e.g., for integrated devices such as Bluetooth headsets), the host stack and controller stack may be run on the same microprocessor to reduce mass production costs. For such "hostless systems," the HCI may be optional, and may be implemented as an internal software interface.

A link 130 established between two devices 110 (e.g., between a device 110-a and a device 110-b) may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., device 110-b) are acknowledged, and may be retransmitted if not acknowledged during a retransmission window. In addition, audio may be streamed between the device 110-a and paired device 110-b using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some cases, a device 110 may be capable of both Bluetooth and WLAN communications. For example, WLAN and Bluetooth components may be co-located within a device 110-a, such that the device 110-a may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a device 110-a may support WLAN communications via AP 105 (e.g., over communication links 120). The AP 105 and the associated devices 110 may represent a basic service set (BSS) or an extended service set (ESS). The various devices 110 in the network may be able to communicate with one another through the AP 105. In some cases the AP 105 may be associated with a coverage area, which may represent a basic service area (BSA).

In some examples, content, media, audio, etc. exchanged between a device 110-a and a device 110-b may originate from a WLAN. For example, in some cases, device 110-a may receive audio from an AP 105 (e.g., via WLAN communications), and the device 110-a may then relay or pass the audio to the paired device 110-b (e.g., via Bluetooth communications). In some cases, certain types of Bluetooth communications (e.g., such as high quality or high definition (HD) Bluetooth) may require enhanced quality of service. For example, in some cases, delay-sensitive Bluetooth traffic may have higher priority than other types of short-range traffic or WLAN traffic.

In some cases, system 100 may utilize TDMA protocols where a master device manages pertinent parameters of a TDMA link between two devices (e.g., between a master and slave device). A TDMA link may be associated with both master transmit/slave receive instances and master receive/slave transmit instances. Two examples of such links may include Bluetooth Basic Rate/Enhanced Data Rate (BR/EDR) links, which may use a timebase known as a Bluetooth slot (e.g., repeating every 625 us), and Bluetooth low energy (BLE) links (e.g., which may have no fixed slot length, but may configure transmission and reception in connection events, which can last less than 625 us and substantially longer). In both systems, one device may transmit at an agreed time, known as the instant (e.g., or communication occasion), during which another device may receive. There may be periods of no transmissions or receptions in between instants, known as idle time. Two devices in a TDMA link with one another may synchronize their transmit and receive times to participate in the connection and reliably exchange data. For example, in Bluetooth BR/EDR and BLE links, one device may operate as the Master of the link (e.g., device 110-a), and may control scheduling information (connection instants) in the time domain and scheduling information (frequency hopping sequences) in the frequency domain. Further, one or more devices may operate as a Slave (e.g., device 110-b and device 110-d), and may be reliant on the Master device to manage the pertinent parameters of the link (e.g., links 130-c and 130-a, respectively).

If a device is taking part in an additional TDMA link with a third device (or also with a fourth device, and so on), scheduling issues may occur between the two TDMA links (e.g., communications over the links may interfere, or the respective network bandwidth as a function of time may be unavailable for use in additional links). Such may lead to inefficient bandwidth utilization or, in some cases, negative user experience from interfering/dropped links. As such, system 100 may support a NNA protocol, enabling devices 110 participating in TDMA links to inform peer devices of their current (e.g., ongoing) connection commitments, and future (e.g., desired) connection preferences, and to identify from peer devices any current connections they are participating in, the types of data being transferred (such as synchronous data, asynchronous data, isochronous data, audio, etc.) and the connection type (such as BR/EDR or BLE connections).

In one example, such scheduling information, link properties, etc. may be exchanged via a dedicated NNC. The dedicated NNC may include a calculated timebase with entries for at least some if not all affected devices to add their respective links into, with a seed timebase based upon the current known links in which the seeding device participates. Devices 110 may thereafter communicate the presence of the NNC, and peer devices may periodically synchronize to the NNC to check whether other peer devices have possible clashing connection commitments and update such information accordingly. Devices may further synchronize to the NNC to provide information about the context of their current connections (e.g., the type of data being transferred, such as audio data), which may influence the decisions of their peer devices whose assent they require and whose participation in the NNC may provide a benefit for as-yet uncoordinated devices to maximize bandwidth utilization.

In another example, point-to-point messages may be exchanged between devices 110 to inform each other of current communications links, and the type of data being transferred on said links. As one device informs its peer of its network neighborhood, that peer may relay (e.g., after an appropriate timebase conversion, if required) to its other peers. For example, device 110-a informs device 110-b of its network neighborhood, that device 110-*b* may relay such information (e.g., after an appropriate timebase conversion, if required) to device 110-*c*.

Such NNA protocol implementations may increase available bandwidth in network neighborhoods and enhance user experience (e.g., by reducing pathological timing clashes). For example, audio data quality, and hence user experience, may be particularly sensitive to degradation when devices encounter such clashes between links. The described techniques may avoid and reduce such clashes via coordinated transmission scheduling.

In one example, device 110-*a* may synchronize transmission and reception times with device 110-*b* over link 130-*a* to ensure availability and reliably exchange messages or data. In some cases, the link 130-*a* may refer to a BLE link which may employ frequency hopping spread spectrum (FHSS) techniques. The timing of link 130-*a* may be governed by the clock of device 110-*a* (e.g., the clock of the master device of the link 130-*a*). Device 110-*a* may be responsible for the generation of a hopping sequence for the communication link 130-*a*. For example, device 110-*a* may generate a sequence including an unrepeated pattern of frequencies the devices 110-*a* and 110-*b* will occupy during communications and the instants in time at which the devices 110-*a* and 110-*b* are expected to transmit and/or receive. Device 110-*b* may also be engaged in a link 130-*b* with another device (e.g., device 110-*c*). The link 130-*b* may transfer, for example, Bluetooth BR/EDR audio, also using FHSS. The timing of link 130-*b* may be governed by the clock of device 110-*c* (e.g., the clock of the master device of the link 130-*b*). Device 110-*c* may be responsible for the generation of a hopping sequence and associated timing instants for the communication link 130-*b*.

However, in such an example, device 110-*a* may be unaware of the clock information of device 110-*c* (e.g., which governs link 130-*b*, of which device 110-*b* is engaged in), as well as the type of data being transferred via link 130-*b*. Similarly, device 110-*c* may be unaware of the clock information of device 110-*a* (e.g., which governs link 130-*a*, of which device 110-*b* is engaged in), as well as the type of data being transferred via link 130-*a*. As device 110-*b* may be designated as the slave device in both of link 130-*a* and link 130-*b*, device 110-*b* may be unable to compel either device 110-*a* or device 110-*c* to adjust the timing and hopping sequences of respective link 130-*a* and link 130-*b*.

Further, device 110-*a* may be utilizing a portion (e.g., 30%) of its available bandwidth on the BLE connection to accommodate link 130-*a*, and may desire to maintain link 130-*a* while adding another link (e.g., link 130-*c*) to communicate with another device (e.g., device 110-*d*). Device 110-*c* may also be utilizing a portion (e.g., 30%) of its available bandwidth on the BR/EDR connection to communicate with device 110-*b* via link 130-*b*, and may desire to maintain link 130-*b* while adding another link (e.g., link 130-*d*) to communicate with another device (e.g., device 110-*e*).

The addition of link 130-*c* may cause device 110-*a* to rearrange link properties (e.g., transmission time periods, transmission intervals, and hopping sequence) governing link 130-*a*, and the addition of link 130-*d* may cause device 110-*c* to rearrange link properties (e.g., transmission time periods, transmission intervals, and hopping sequence) governing link 130-*b*. In such an example, device 110-*b* may be utilizing 60% of its available bandwidth (e.g., 30% on link 130-*a* and 30% on link 130-*b*), and may have no means (e.g., without implementing the described techniques) by which it can notify either device 110-*a* of the presence and characteristics of link 130-*b*, or notify device 110-*c* of the presence and characteristics of link 130-*a*.

In some cases, such updating of link properties described above may result in a pathological conflict between links (e.g., between link 130-*b* and link 130-*a*) such that device 110-*b* may be forced to disconnect from link 130-*a* or from link 130-*b* in order to maintain one of the other links, which may depend on the relative priorities device 110-*b* assigns to link 130-*a* and link 130-*b*. For example, in cases where a pathological conflict (e.g., overlapping instants) arises between link 130-*a* and link 130-*b*, device 110-*b* may experience link degradation associated with one or both of links, or in some cases my drop a link associated with a lower priority (e.g., a link transferring lower priority traffic).

System 100 may implement NNA techniques to reduce or avoid issues arising from the example described above. According to the described techniques, some or all of devices 110-*a*, 110-*b*, 110-*c*, 110-*d*, and 110-*e* may coordinate transmission sequences and respective hopping sequences such that the available bandwidth in the network neighborhood (e.g., in system 100) is more efficiently utilized. Such techniques may provide improved experience for the greatest number of users. For example, efficient transmission schedule coordination may allow for more users to effectively utilize the available bandwidth in the network neighborhood.

Further, transmission schedule negotiation and transmission schedule coordination techniques that consider link properties of existing and future links may provide for link prioritization (e.g., or data transfer type prioritization) within the coordinated transmission schedule. Such may also provide for more efficient link modification (e.g., link modifications due to coordinated transmission scheduling), as some links may be associated with link properties that are more suitable for modification (e.g., links with link properties more suitable for modification may be prioritized for modification, when appropriate to identify a coordinated transmission schedule).

The NNA protocol may support a set of messages to allow any device in a link to notify other devices (e.g., to which the device is engaged in a communications link with) of the presence of unrelated communications links which could benefit from alignment. For example, communications between devices 110 may relay information on the network neighborhood from one device to another. Such messages may further coordinate updating of link parameters between uncoordinated devices (e.g., between device 110-*b* and device 110-*e*). As such, before uncoordinated devices (e.g., devices without an established link with each other) establish links that may interfere (e.g., before device 110-*a* and device 110-*c* establish or modify links with device 110-*b* that may interfere), negotiation may take place in order to identify the best intervals and periods for transmissions.

In some examples, a common timebase may be established for the network neighborhood (e.g., a common timebase for exchange of timing information pertaining to various links within the network neighborhood). For example, a common timebase may refer to a time unit (or clock aspect) associated with conveyed scheduling information. In some cases, the common timebase may be a common factor between two symbol rates (e.g., the fundamental 'tick' of the TDMA system, the smallest possible clock period of that system). In some cases, the common timebase may depend on the clock granularity of the various devices in the network neighborhood. A device with the most granular clock or timebase may create a common timebase for other devices. For example, if the timebase is a microsecond and a device enters the network neighborhood with a more granular clock (e.g., a nanosecond clock), the new device may signal such and the timebase may be updated accordingly. Devices may then synchronize based on the timebase.

In one example, a dedicated NNC may include the calculated timebase with entries for at least some if not all affected devices to add their respective links into, with a seed timebase based upon the current known links in which the seeding device participates. Devices can thereafter communicate the presence of the NNC, and peers can periodically synchronize to the NNC to check whether other peers have possible clashing connection commitments and update such information accordingly. Further, peers can periodically synchronize to the NNC to provide information about the context of their current connections (e.g., the type of data being transferred, such as audio data), which may influence the decisions of their peer devices whose assent they require and whose participation in the NNC would provide a benefit for as-yet uncoordinated devices to maximize bandwidth utilization.

In another example, point-to-point (e.g., device-to-device) messages may be exchanged between devices to inform each other of their current communications links, and the type of data being transferred on said links. As one device informs its peer of its Network Neighborhood, that peer may relay (e.g., after an appropriate timebase conversion, if required) to its other peers.

In some cases, the seed timebase (e.g., a timebase of the link information entered into the NNC or otherwise indicated by a seeding device, or a device participating in the particular link) may be determined based on the seeding device's clock. In some cases, the timebase may be converted to a higher resolution if another device (e.g., another device passing along or otherwise utilizing the timing information) so generates. If such a situation occurs, the higher-resolution information may be lost on the lower-resolution device insofar as it would just convert back to its own base.

For example, device 110-a may generate a 10 us timebase, and may inform (e.g., through one or more signaling techniques) device 110-b it's occupied for some period of 10 us slots, with a periodicity of {x*10 us}. Device 110-b may communicate the snapshot of link 130-a to device 110-c. The communication may include the clock of device 110-b at which it's required to participate in link 130-a and the periodicity of the participation (e.g., 10 us slots, occupied for 3*10 us slots at a time, spaced 25*10 us apart). Device 110-c may decide to shift link 130-b around to help device 110-b, and device 110-c may inform or instruct device 110-b to move forward in time (increasing its own clock value) by some number.

In some cases, device 110-c may indicate to device 110-b a snapshot of where device 110-c would like device 110-b to move to in time. When device 110-b receives the snapshot from device 110-c, device 110-b may notice the timebase is now 5 us (e.g., device 110-b may notice device 110-c has categorized link 130-a terms of a more granular timebase, such that link 130-a is indicated as occupying 6*5 us slots, spaced 50*5 us slots apart).

Device 110-b may communicate the updated link 130-b information back to device 110-a alongside the already known link 130-a information and device 110-a may identify that device 110-c has generated a higher resolution timebase. Device 110-a may be capable of distinguishing events 10 us apart, thus device 110-a may swap the timebase back to 10 us (with the 2*5 us slot occupancy returning to 1*10 us slot and the periodicity of 250*5 us returning to 25*10 us for link 130-a, treating whatever it gets for link 130-b in the same manner.

Figure 2:
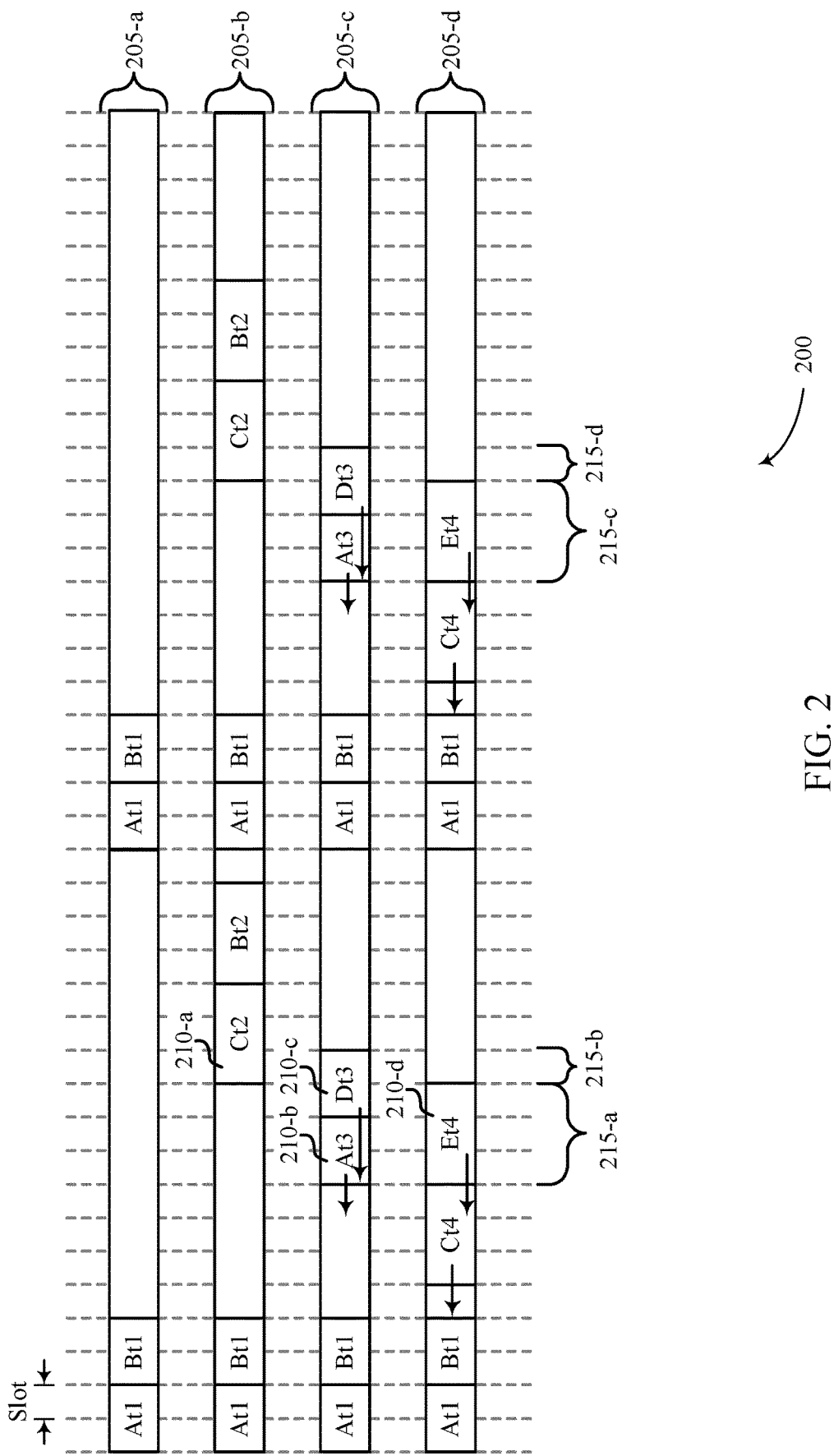
FIGS. 2 and 3 illustrate examples of transmission scheduling that supports network neighborhood alignment in accordance with aspects of the present disclosure.

FIG. 2 illustrates an example of transmission scheduling 200 that supports network neighborhood alignment in accordance with aspects of the present disclosure. In some examples, transmission scheduling 200 may implement aspects of system 100. For example, transmission scheduling 200 may illustrate transmission schedules 205 for four links within a network neighborhood. Each transmission schedule 205 may include transmit instances 210 from each device participating in the link. Transmission scheduling 200 may illustrate how scheduling conflicts may arise, and transmission scheduling 300 (e.g., described with reference to FIG. 3) may illustrate coordinated transmission scheduling using NNA techniques.

Transmission schedule 205-a may illustrate transmit instances 210 for a first link (e.g., Link 1) between a device A and a device B, where
At1=Device A Tx instant/Device B Rx instant in Link 1, and
Bt1=Device B Tx instant/Device A Rx instant in Link 1.

Transmission schedule 205-b may illustrate transmit instances 210 for a second link (e.g., Link 2) between device B and a device C, where
Ct2=Device C Tx instant/Device B Rx instant in Link 2, and
Bt2=Device B Tx instant/Device C Rx instant in Link 2.

Transmission schedule 205-c may illustrate transmit instances 210 for a third link (e.g., Link 3) between device A and a device D, where
At3=Device A Tx instant/Device D Rx instant in Link 3, and
Dt3=Device D Tx instant/Device A Rx instant in Link 3.

Transmission schedule 205-d may illustrate transmit instances 210 for a fourth link (e.g., Link 4) between device C and a device E, where
Ct4=Device C Tx instant/Device E Rx instant in Link 4, and
Et4=Device E Tx instant/Device C Rx instant in Link 4.

Device A may add (e.g., or establish) Link 1 with Device B. Device C may add (e.g., or establish) Link 2 with Device B. It can be seen that if Device A would desire to add (e.g., or establish) Link 3 with Device D, a conflict may arise with Link 2. For example, instant 210-c associated with Link 3 may overlap (e.g., clash) with instant 210-a associated with Link 2 (e.g., over duration 215-b, and similarly another clash may occur over duration 215-d). Further if Device C would desire to add (e.g., or establish) Link 4 with Device E, a conflict may arise with Link 3. For example, instant 210-d associated with Link 4 may overlap (e.g., clash) with instant 210-b and instant 210-c associated with Link 3 (e.g., over duration 215-a, and similarly another clash may occur over duration 215-c). According to the described techniques, transmission schedule 205-c and transmission schedule 205-d may be modified (e.g., instants 210-b, 210-c, and 210-d may be modified and/or shifted) according to an identified coordinated transmission schedule (e.g., Device A and Device C may modify Link 3 and Link 4 based on scheduling information received from peer devices).

For example, Device B, participating in Link 2 and being informed of Link 3 (e.g., via a message from Device A), may send a message to Device A or to Device C to inform them of a scheduling conflict and request a reorientation of the Tx/Rx instants on one or both of Link 3 and Link 4. Alternatively, Device C could send a message to Device B upon adding Link 4 to compel Device B to reorient the Tx/Rx instants of Link 2, and Device B could respond with its other commitments to allow Device C to attempt a new link orientation.

An instant 210, from the time domain perspective, may refer to an occupation (e.g., a communication occasion) of the airwaves by the particular link. For example, at instant 210-a, Device C may transmit in Link 2 whilst Device B received in Link 2, followed by an instant where Device B transmits whilst Device C receives). As an example, Link 1 may be categorized by a 1us timebase, a 625 us slot length, and a 2 slot period at 17 slot intervals. The interval periods are therefore at Device A[clock]+(n) 11*625 us where n is the number of intervals that pass from the point at which Device A[clock] was first used to seed the timebase.

Link 2 may have its first instant at (e.g., from Device B's perspective here since it is the only participant in both Link 1 and Link 2) Device B[clock] (e.g., where Device B[clock] =Device A[clock]+some_offset)+9 slots, since that's how many slots it takes to get from the At1 transmit instant to the Ct2 transmit instant. Link 2 may have a slot period of 3 slots, assuming B and C use the same timebase, and some slot interval. The window between Link 1 instants is punctured by the presence of Link 2.

Figure 3:
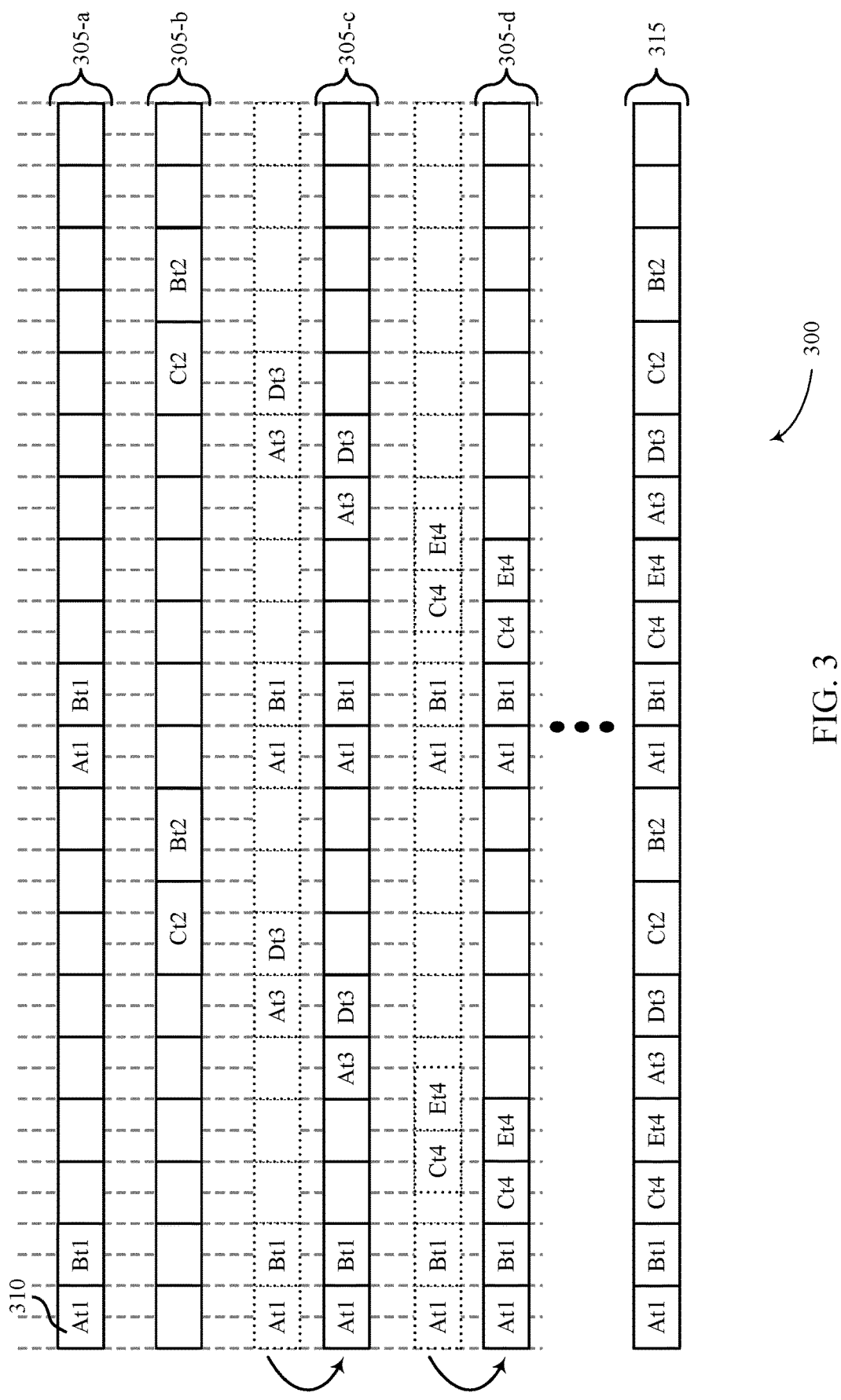

FIG. 3 illustrates an example of transmission scheduling 300 that supports network neighborhood alignment in accordance with aspects of the present disclosure. In some examples, transmission scheduling 300 may implement aspects of system 100. For example, transmission scheduling 300 may illustrate transmission schedules 305 for four links within a network neighborhood, as well as a NNC 315. Each transmission schedule 305 may include transmit instances 310 from each device participating in the link. Transmission scheduling 300 may illustrate coordinated transmission scheduling using NNA techniques.

Transmission schedule 305-a may illustrate transmit instances 310 for a first link (e.g., Link 1) between a device A and a device B, where
At1=Device A Tx instant/Device B Rx instant in Link 1, and
Bt1=Device B Tx instant/Device A Rx instant in Link 1.

Transmission schedule 305-b may illustrate transmit instances 310 for a second link (e.g., Link 2) between device B and a device C, where
Ct2=Device C Tx instant/Device B Rx instant in Link 2, and
Bt2=Device B Tx instant/Device C Rx instant in Link 2.

Transmission schedule 305-c may illustrate transmit instances 310 for a third link (e.g., Link 3) between device A and a device D, where
At3=Device A Tx instant/Device D Rx instant in Link 3, and
Dt3=Device D Tx instant/Device A Rx instant in Link 3.

Transmission schedule 305-d may illustrate transmit instances 310 for a fourth link (e.g., Link 4) between device C and a device E, where
Ct4=Device C Tx instant/Device E Rx instant in Link 4, and
Et4=Device E Tx instant/Device C Rx instant in Link 4.

A NNC 315 containing the neighborhood timebase with entries for at least some if not all devices to add their respective links into may provide for coordinated transmission scheduling by the devices A, B, C, and D. Devices may periodically listen to the NNC to check whether their peers have other commitments and append accordingly. Alternatively, any device can generate their preferred timebase and send it to any other device to which it is connected. Alternatively, any Device may communicate their proposed commitments for new links to connected devices which may in turn respond with their commitments and flag any possible conflicts.

For example, Device A and Device C may synchronize with the NNC 315 prior to establishing Link 3 and Link 4, such that Device A and Device C may appropriately shift instances 310 (e.g., modify link properties) of Link 3 and Link 4 for coordinated transmission scheduling. Device A may identify scheduling information (e.g., of Link 1 and Link 2) from the NNC 315, and may modify Link 3 based on identifying a coordinated transmission schedule as shown. Device A may then insert Link 3 scheduling information in the NNC 315. Device C may then identify scheduling information (e.g., of Link 1, Link 2, and Link 3) from the NNC 315, and may modify Link 4 based on identifying a coordinated transmission schedule as shown. Device C may then insert Link 4 scheduling information in the NNC 315.

In other examples, devices may exchange link scheduling information via point-to-point messages. For example, before adding Link 3, Device A may ask Device B of Device B's current commitments, Device B may respond with scheduling information, and Device A may become aware Link 3 will conflict. As such, Device A may identify a coordinated transmission schedule (e.g., taking into account any scheduling information from Device B), and modify (e.g., or update) Link 3 accordingly. Before adding Link 4, Device C may request Device B of Device B's current commitments, Device B may respond (e.g., device B informs device C its own scheduling information as well as scheduling information from device A, such as Link 1 and Link 3 scheduling information), and Device C may then become aware Link 4 will conflict. As such, Device C may identify a coordinated transmission schedule (e.g., taking into account scheduling information from Device B), and modify (e.g., or update) Link 4 accordingly.

Device B may inform Device C of at least some if not all known scheduling information (e.g., scheduling information associated with Device B's Link 1, as well as scheduling information Device B received from Device A associated with Device A's Link 2. Device C may add this to its own knowledge of Link 2 and Link 4 to identify a coordinated transmission schedule. Device C may modify Link 2 or Link 4 or both of them. In the present example, Device C may modify Link 4 to not conflict with Link 3 by shifting the instant some number of timebase (e.g., clock ticks) until the instant is assumed to not clash any longer.

In some cases, Device C may also attempt to shift more data for a shorter period to one of the devices, and claw back some time from the slot period in doing so (e.g., to higher order modulation) to allow it to shorten the period. Such may result in more scheduling flexibility. In general, device C may identify conflicts (e.g., potential clashes) and identify coordinated transmission schedules via computations on the known clocks or clock offsets, instants, periods, and intervals (e.g., to identify overlapping instances across two or more links). Device C could also ask Device B to ask Device A to move things around on Device A's side.

Figure 4:
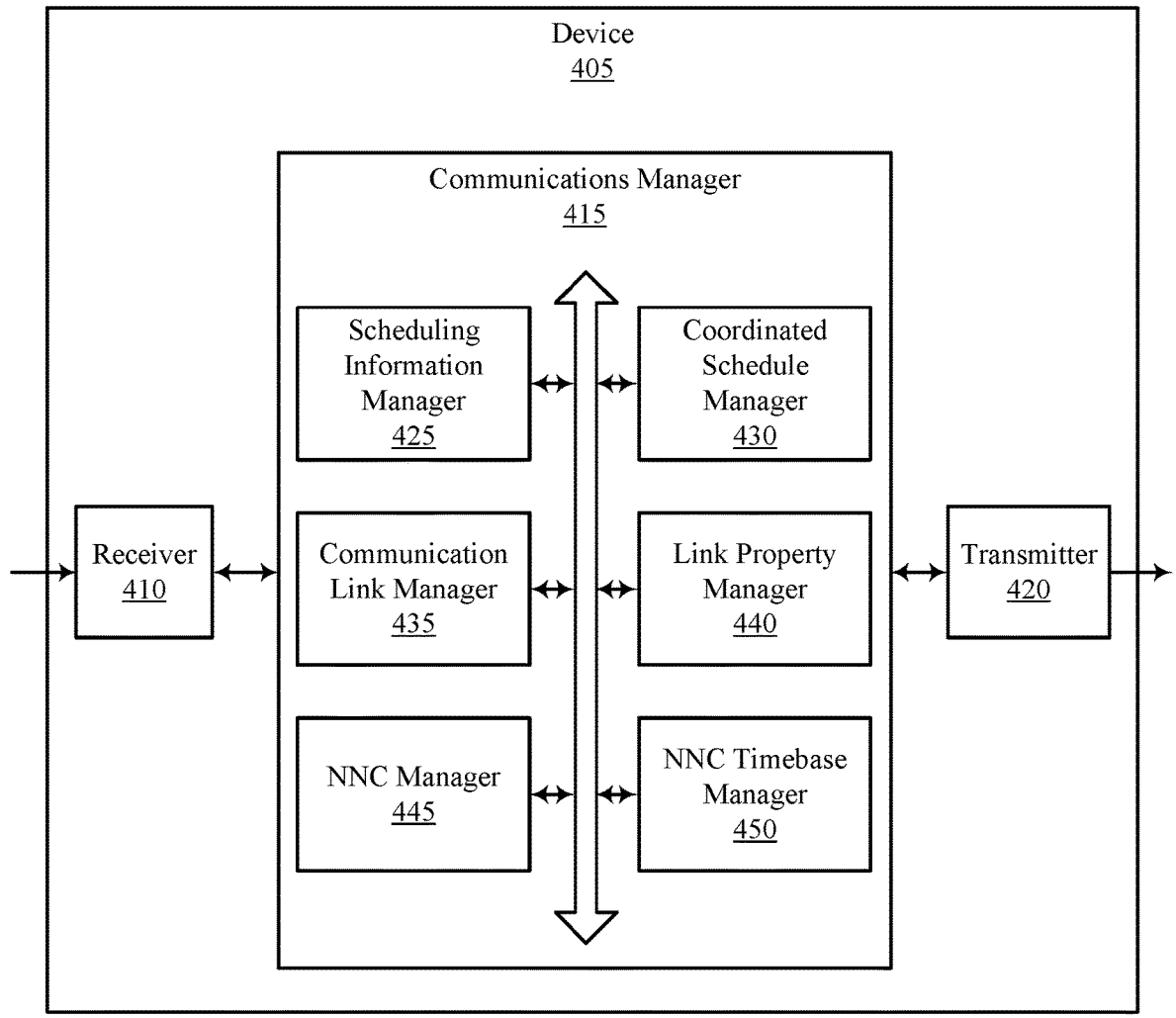
FIG. 4 shows a block diagrams of a device that supports network neighborhood alignment in accordance with aspects of the present disclosure.

FIG. 4 shows a block diagram 400 of a device 405 that supports network neighborhood alignment in accordance with aspects of the present disclosure. The device 405 may be an example of aspects of a device 110 as described herein. The device 405 may include a receiver 410, a communications manager 415, and a transmitter 420. The device 405 may also include a processor. Each of these components may be in communication with one another (e.g., via one or more buses).

The receiver 410 may receive information such as packets, user data, or control information associated with various information channels (e.g., control channels, data channels, and information related to network neighborhood alignment, etc.). Information may be passed on to other components of the device 405. The receiver 410 may be an example of aspects of the transceiver 520 described with reference to FIG. 5. The receiver 410 may utilize a single antenna or a set of antennas. In some examples, the receiver 410 may be an example of a means for receiving scheduling information for a first time division multiple access link between a second wireless device and a third wireless device.

The communications manager 415 may receive scheduling information for a first time division multiple access link between a second wireless device and a third wireless device, and identify, based on the scheduling information for the first time division multiple access link, a coordinated transmission schedule that includes transmission scheduling information for the first time division multiple access link and a second time division multiple access link between the device 405 and another wireless device. The communications manager 415 may then modify (e.g., or in some cases establish) the second time division multiple access link between the device 405 and the another wireless device based on the coordinated transmission schedule. The communications manager 415 may be an example of aspects of the communications manager 510 described herein.

The communications manager 415, or its sub-components, may be implemented in hardware, code (e.g., software or firmware) executed by a processor, or any combination thereof. If implemented in code executed by a processor, the functions of the communications manager 415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 415, or its sub-components, may be physically located at various positions, including being distributed such that portions of functions are implemented at different physical locations by one or more physical components. In some examples, the communications manager 415, or its sub-components, may be a separate and distinct component in accordance with various aspects of the present disclosure. In some examples, the communications manager 415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, the communications manager 415 may include a scheduling information manager 425, a coordinated schedule manager 430, a communication link manager 435, a link property manager 440, a NNC manager 445, and a NNC timebase manager 450. Each of these modules may communicate, directly or indirectly, with one another (e.g., via one or more buses).

The scheduling information manager 425 may receive scheduling information for a first time division multiple access link between a second wireless device and a third wireless device. In some examples, receiving the scheduling information includes receiving the scheduling information from the second wireless device. In some examples, the scheduling information manager 425 may identify one or more communication periods associated with the first time division multiple access link, the second time division multiple access link, or both. In some examples, the scheduling information manager 425 may transmit the scheduling information for the first time division multiple access link, scheduling information for the second time division multiple access link, the coordinated transmission schedule, or some combination thereof, to a fourth wireless device.

The coordinated schedule manager 430 may identify, based on the scheduling information for the first time division multiple access link, a coordinated transmission schedule that includes transmission scheduling information for the first time division multiple access link and a second time division multiple access link between the device 405 and another wireless device. In some examples, the coordinated schedule manager 430 may identify a scheduling conflict based on the one or more communication periods, where the coordinated transmission schedule is identified based on the identified scheduling conflict. In some cases, the another wireless device includes the second wireless device. In some cases, the another wireless device includes a fourth wireless device. In some cases, the coordinated transmission schedule is identified based on a connection preference for the modified second time division multiple access link. In some examples, coordinated schedule manager 430 may be an example of a means for identifying, based at least in part on the scheduling information for the first time division multiple access link, a coordinated transmission schedule that comprises transmission scheduling information for the first time division multiple access link and a second time division multiple access link between the first wireless device and another wireless device.

The communication link manager 435 may modify (e.g., or in some cases establish) the second time division multiple access link between the device 405 and the another wireless device based on the coordinated transmission schedule. In some examples, the communication link manager 435 may establish a third time division multiple access link between the device 405 and a fourth wireless device based on the coordinated transmission schedule. In some cases, the coordinated transmission schedule is identified based on a connection preference for the third time division multiple access link. In some examples, coordinated schedule manager 430 may be an example of a means for modifying the second time division multiple access link between the first wireless device and the another wireless device based at least in part on the coordinated transmission schedule.

The link property manager 440 may identify one or more link properties associated with the first time division multiple access link, the second time division multiple access link, or both, where the coordinated transmission schedule is identified based on the one or more link properties. In some cases, the one or more link properties include a synchronous link property, an asynchronous link property, an isochronous link property, a quality of service requirement, or some combination thereof, associated with the first time division multiple access link, or the second time division multiple access, or both.

The NNC manager 445 may monitor a network neighborhood channel, where the scheduling information is received based on the monitoring. In some examples, the NNC manager 445 may advertise scheduling information for the first time division multiple access link, scheduling information for the second time division multiple access link, the coordinated transmission schedule, or some combination thereof, during an entry of the network neighborhood channel.

The NNC timebase manager 450 may identify clock information associated with the second wireless device and the third wireless device. In some examples, the NNC timebase manager 450 may identify a network neighborhood channel timebase based on the clock information, where the coordinated transmission schedule is based on the network neighborhood channel timebase.

The transmitter 420 may transmit signals generated by other components of the device 405. In some examples, the transmitter 420 may be collocated with a receiver 410 in a transceiver module. For example, the transmitter 420 may be an example of aspects of the transceiver 520 described with reference to FIG. 5. The transmitter 420 may utilize a single antenna or a set of antennas.

Figure 5:
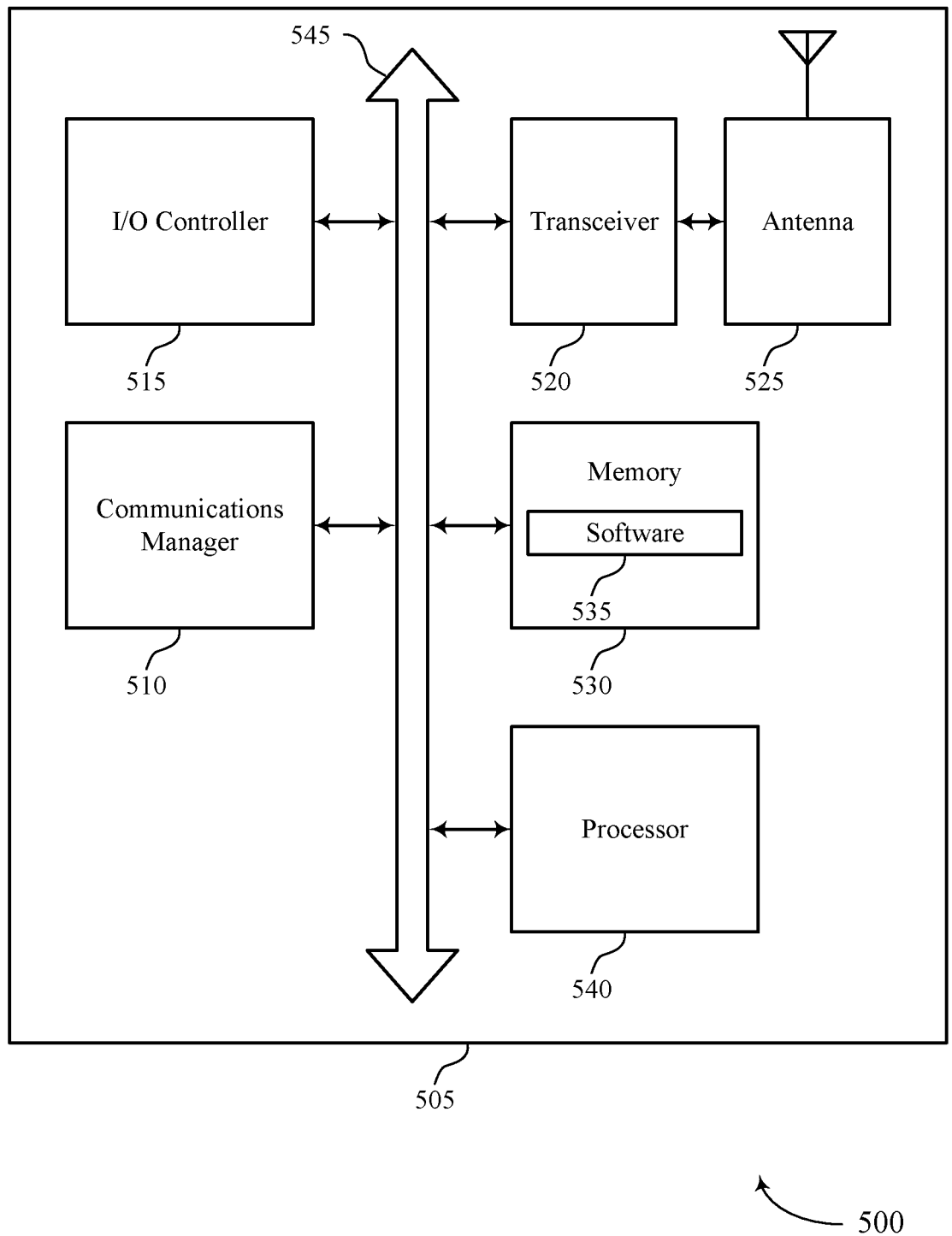
FIG. 5 shows a diagram of a system including a device that supports network neighborhood alignment in accordance with aspects of the present disclosure.

FIG. 5 shows a diagram of a system 500 including a device 505 that supports network neighborhood alignment in accordance with aspects of the present disclosure. The device 505 may be an example of or include the components of device 405 or a device 110 as described herein. The device 505 may include components for bi-directional voice and data communications including components for transmitting and receiving communications, including a communications manager 510, an I/O controller 515, a transceiver 520, an antenna 525, memory 530, and a processor 540. These components may be in electronic communication via one or more buses (e.g., bus 545).

The communications manager 510 may receive scheduling information for a first time division multiple access link between a second wireless device and a third wireless device, identify, based on the scheduling information for the first time division multiple access link, a coordinated transmission schedule that includes transmission scheduling information for the first time division multiple access link and a second time division multiple access link between the device 505 and another wireless device, and modify the second time division multiple access link between the device 505 and the another wireless device based on the coordinated transmission schedule. In some cases, the communications manager 510, the processor 540, or both, may be examples of a means for identifying, based at least in part on the scheduling information for the first time division multiple access link, a coordinated transmission schedule that comprises transmission scheduling information for the first time division multiple access link and a second time division multiple access link between the first wireless device and another wireless device. In some cases, the communications manager 510, the processor 540, or both, may be examples of a means for modifying the second time division multiple access link between the first wireless device and the another wireless device based at least in part on the coordinated transmission schedule.

The I/O controller 515 may manage input and output signals for the device 505. The I/O controller 515 may also manage peripherals not integrated into the device 505. In some cases, the I/O controller 515 may represent a physical connection or port to an external peripheral. In some cases, the I/O controller 515 may utilize an operating system such as iOS®, ANDROID®, MS-DOS®, MS-WINDOWS®, OS/2®, UNIX®, LINUX®, or another known operating system. In other cases, the I/O controller 515 may represent or interact with a modem, a keyboard, a mouse, a touchscreen, or a similar device. In some cases, the I/O controller 515 may be implemented as part of a processor. In some cases, a user may interact with the device 505 via the I/O controller 515 or via hardware components controlled by the I/O controller 515.

The transceiver 520 may communicate bi-directionally, via one or more antennas, wired, or wireless links as described above. For example, the transceiver 520 may represent a wireless transceiver and may communicate bi-directionally with another wireless transceiver. The transceiver 520 may also include a modem to modulate the packets and provide the modulated packets to the antennas for transmission, and to demodulate packets received from the antennas. In some cases, the transceiver 520 may be an example of a means for receiving scheduling information for a first time division multiple access link between a second wireless device and a third wireless device.

In some cases, the wireless device may include a single antenna 525. However, in some cases the device may have more than one antenna 525, which may be capable of concurrently transmitting or receiving multiple wireless transmissions.

The memory 530 may include RAM and ROM. The memory 530 may store computer-readable, computer-executable code or software 535 including instructions that, when executed, cause the processor to perform various functions described herein. In some cases, the memory 530 may contain, among other things, a BIOS which may control basic hardware or software operation such as the interaction with peripheral components or devices.

The processor 540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 540 may be configured to operate a memory array using a memory controller. In other cases, a memory controller may be integrated into the processor 540. The processor 540 may be configured to execute computer-readable instructions stored in a memory (e.g., the memory 530) to cause the device 505 to perform various functions (e.g., functions or tasks supporting network neighborhood alignment).

The software 535 may include instructions to implement aspects of the present disclosure, including instructions to support wireless communications. The software 535 may be stored in a non-transitory computer-readable medium such as system memory or other type of memory. In some cases, the software 535 may not be directly executable by the processor 540 but may cause a computer (e.g., when compiled and executed) to perform functions described herein.

Figure 6:
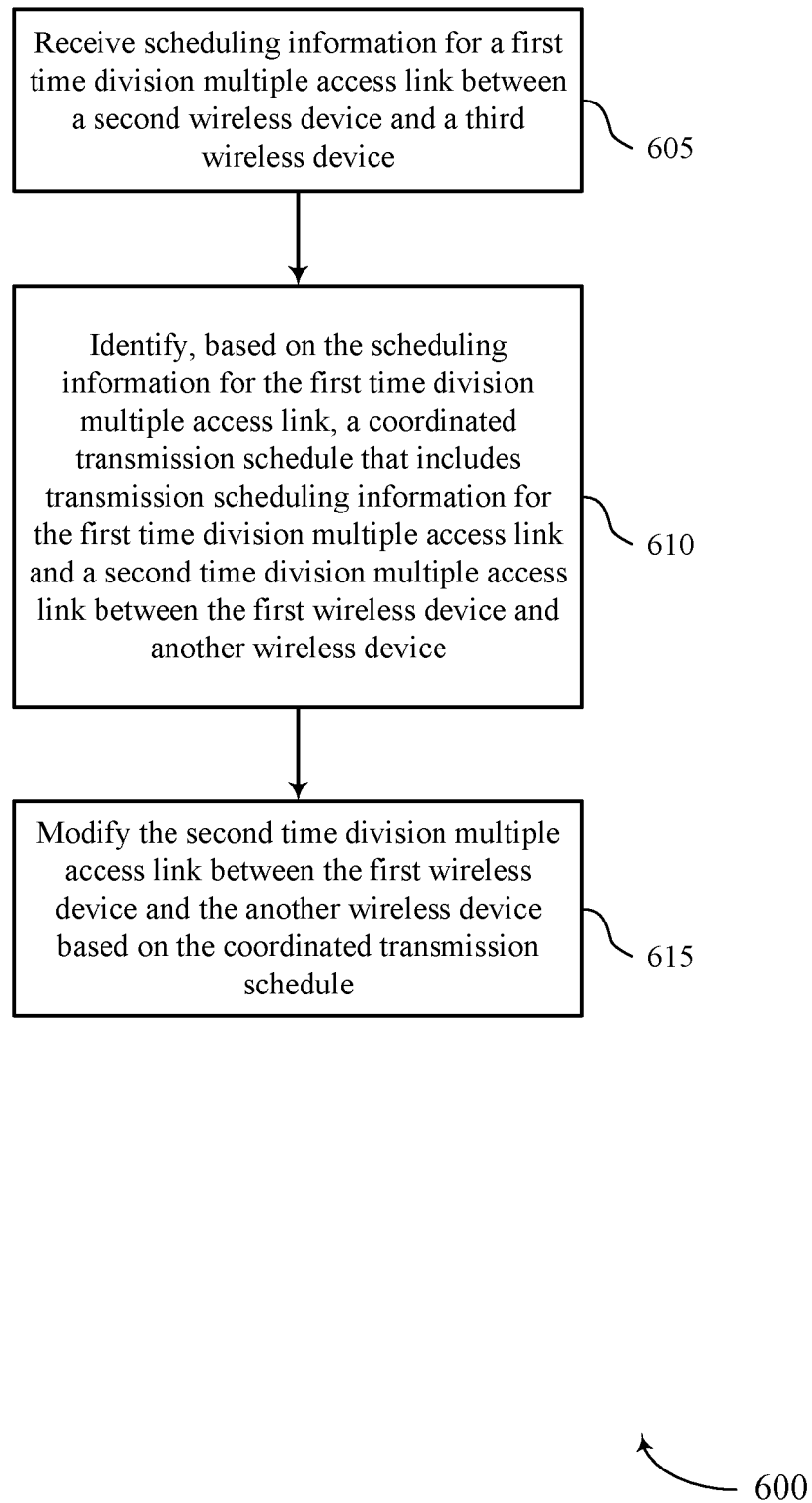
FIGS. 6 through 8 show flowcharts illustrating methods that support network neighborhood alignment in accordance with aspects of the present disclosure.

FIG. 6 shows a flowchart illustrating a method 600 that supports network neighborhood alignment in accordance with aspects of the present disclosure. The operations of method 600 may be implemented by a device or its components as described herein. For example, the operations of method 600 may be performed by a communications manager as described with reference to FIGS. 4 through 5. In some examples, a device may execute a set of instructions to control the functional elements of the device to perform the functions described below. Additionally or alternatively, a device may perform aspects of the functions described below using special-purpose hardware.

At 605, the device may receive scheduling information for a first time division multiple access link between a second wireless device and a third wireless device. The operations of 605 may be performed according to the methods described herein. In some examples, aspects of the operations of 605 may be performed by a scheduling information manager as described with reference to FIGS. 4 through 5.

At 610, the device may identify, based on the scheduling information for the first time division multiple access link, a coordinated transmission schedule that includes transmission scheduling information for the first time division multiple access link and a second time division multiple access link between the device and another wireless device. The operations of 610 may be performed according to the methods described herein. In some examples, aspects of the operations of 610 may be performed by a coordinated schedule manager as described with reference to FIGS. 4 through 5.

At 615, the device may modify the second time division multiple access link between the device and the another wireless device based on the coordinated transmission schedule. The operations of 615 may be performed according to the methods described herein. In some examples, aspects of the operations of 615 may be performed by a communication link manager as described with reference to FIGS. 4 through 5.

Figure 7:
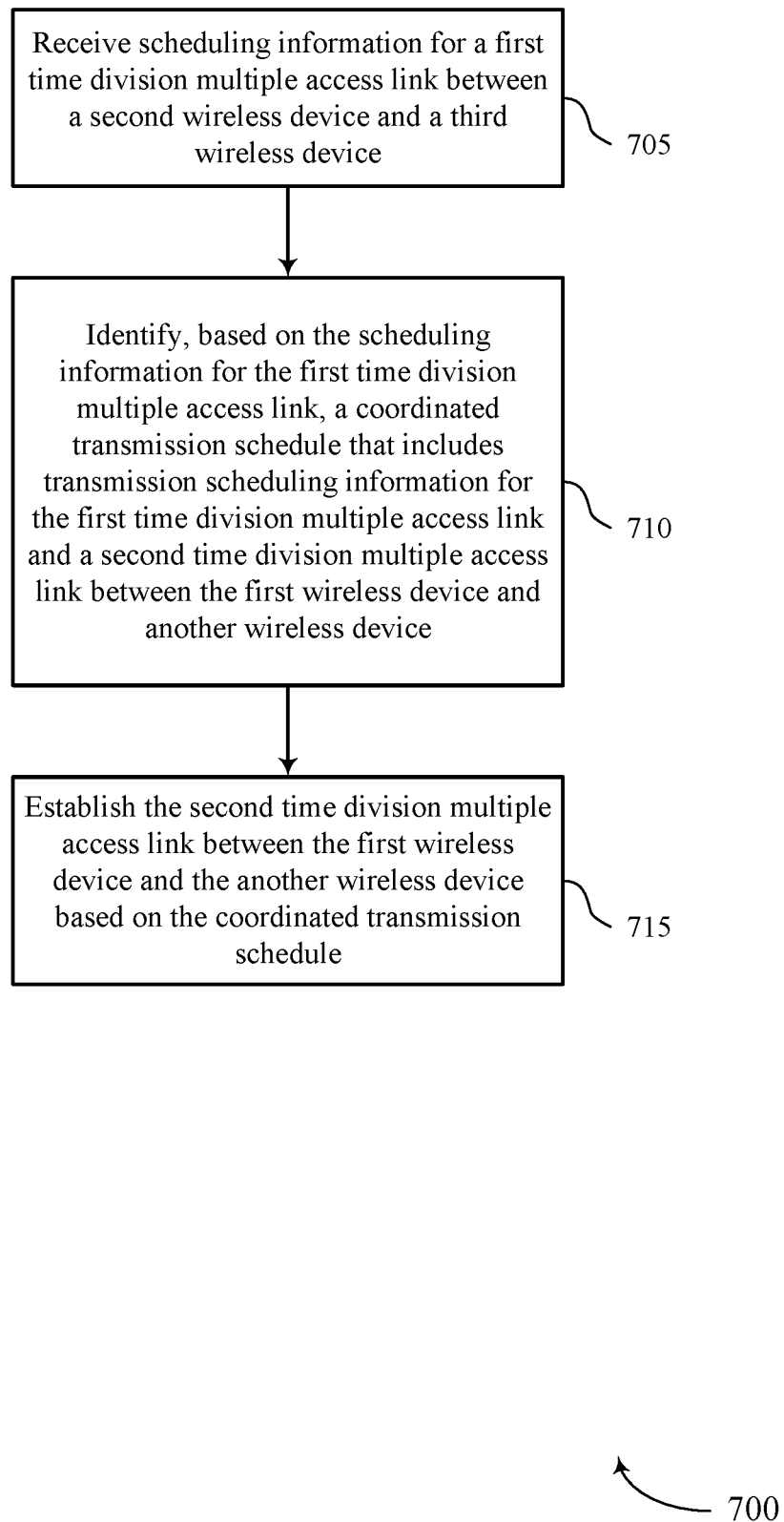

FIG. 7 shows a flowchart illustrating a method 700 that supports network neighborhood alignment in accordance with aspects of the present disclosure. The operations of method 700 may be implemented by a device or its components as described herein. For example, the operations of method 700 may be performed by a communications manager as described with reference to FIGS. 4 through 5. In some examples, a device may execute a set of instructions to control the functional elements of the device to perform the functions described below. Additionally or alternatively, a device may perform aspects of the functions described below using special-purpose hardware.

At 705, the device may receive scheduling information for a first time division multiple access link between a second wireless device and a third wireless device. The operations of 705 may be performed according to the methods described herein. In some examples, aspects of the operations of 705 may be performed by a scheduling information manager as described with reference to FIGS. 4 through 5.

At 710, the device may identify, based on the scheduling information for the first time division multiple access link, a coordinated transmission schedule that includes transmission scheduling information for the first time division multiple access link and a second time division multiple access link between the device and another wireless device. The operations of 710 may be performed according to the methods described herein. In some examples, aspects of the operations of 710 may be performed by a coordinated schedule manager as described with reference to FIGS. 4 through 5.

At 715, the device may establish the second time division multiple access link between the device and the another wireless device based on the coordinated transmission schedule. The operations of 715 may be performed according to the methods described herein. In some examples, aspects of the operations of 715 may be performed by a communication link manager as described with reference to FIGS. 4 through 5.

Figure 8:
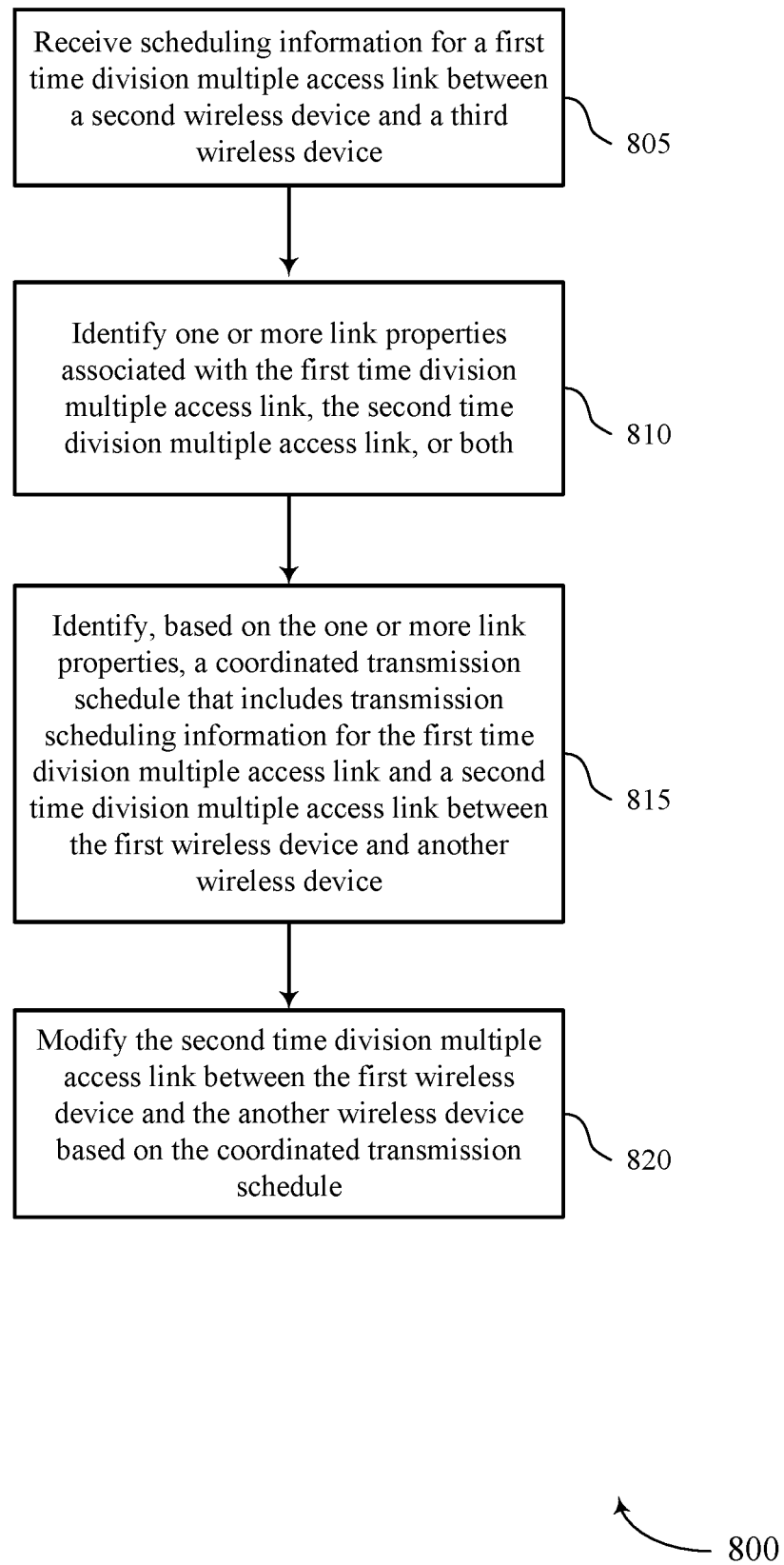

FIG. 8 shows a flowchart illustrating a method 800 that supports network neighborhood alignment in accordance with aspects of the present disclosure. The operations of method 800 may be implemented by a device or its components as described herein. For example, the operations of method 800 may be performed by a communications manager as described with reference to FIGS. 4 through 5. In some examples, a device may execute a set of instructions to control the functional elements of the device to perform the functions described below. Additionally or alternatively, a device may perform aspects of the functions described below using special-purpose hardware.

At 805, the device may receive scheduling information for a first time division multiple access link between a second wireless device and a third wireless device. The operations of 805 may be performed according to the methods described herein. In some examples, aspects of the operations of 805 may be performed by a scheduling information manager as described with reference to FIGS. 4 through 5.

At 810, the device may identify one or more link properties associated with the first time division multiple access link, the second time division multiple access link, or both. The operations of 810 may be performed according to the methods described herein. In some examples, aspects of the operations of 810 may be performed by a link property manager as described with reference to FIGS. 4 through 5.

At 815, the device may identify, based on the one or more link properties, a coordinated transmission schedule that includes transmission scheduling information for the first time division multiple access link and a second time division multiple access link between the device and another wireless device. The operations of 815 may be performed according to the methods described herein. In some examples, aspects of the operations of 815 may be performed by a coordinated schedule manager as described with reference to FIGS. 4 through 5.

At 820, the device may modify (e.g., or establish) the second time division multiple access link between the device and the another wireless device based on the coordinated transmission schedule. The operations of 820 may be performed according to the methods described herein. In some examples, aspects of the operations of 820 may be performed by a communication link manager as described with reference to FIGS. 4 through 5.

It should be noted that the methods described herein describe possible implementations, and that the operations and the steps may be rearranged or otherwise modified and that other implementations are possible. Furthermore, aspects from two or more of the methods may be combined.

Aspects of the techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the devices may have similar frame timing, and transmissions from different devices may be approximately aligned in time. For asynchronous operation, the devices may have different frame timing, and transmissions from different devices may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, system 100 of FIG. 1—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first wireless device, comprising:
receiving scheduling information for a first time division multiple access link between a second wireless device and a third wireless device;
identifying, based at least in part on the scheduling information for the first time division multiple access link, a coordinated transmission schedule that comprises transmission scheduling information for the first time division multiple access link and a second time division multiple access link between the first wireless device and another wireless device;
establishing a third time division multiple access link between the first wireless device and a fourth wireless device based at least in part on the coordinated transmission schedule, wherein the coordinated transmission schedule is identified based at least in part on a connection preference for the third time division multiple access link; and modifying the second time division multiple access link between the first wireless device and the another wireless device based at least in part on the coordinated transmission schedule.

2. The method of claim 1, further comprising:
identifying one or more link properties associated with the first time division multiple access link, the second time division multiple access link, or both, wherein the coordinated transmission schedule is identified based at least in part on the one or more link properties.

3. The method of claim 2, wherein the one or more link properties comprise a synchronous link property, an asynchronous link property, an isochronous link property, a quality of service requirement, or some combination thereof, associated with the first time division multiple access link, or the second time division multiple access, or both.

4. The method of claim 1, further comprising:
monitoring a network neighborhood channel, wherein the scheduling information is received based at least in part on the monitoring.

5. The method of claim 4, further comprising:
advertising the scheduling information for the first time division multiple access link, scheduling information for the second time division multiple access link, the coordinated transmission schedule, or some combination thereof, during an entry of the network neighborhood channel.

6. The method of claim 1, wherein:
receiving the scheduling information comprises receiving the scheduling information from the second wireless device.

7. The method of claim 1, further comprising:
identifying one or more communication periods associated with the first time division multiple access link, the second time division multiple access link, or both; and
identifying a scheduling conflict based at least in part on the one or more communication periods, wherein the coordinated transmission schedule is identified based at least in part on the identified scheduling conflict.

8. The method of claim 1, further comprising:
transmitting the scheduling information for the first time division multiple access link, scheduling information for the second time division multiple access link, the coordinated transmission schedule, or some combination thereof, to a fourth wireless device.

9. The method of claim 1, wherein the another wireless device comprises the second wireless device.

10. The method of claim 1, wherein the another wireless device comprises a fourth wireless device.

11. The method of claim 1, further comprising:
identifying clock information associated with the second wireless device and the third wireless device; and
identifying a network neighborhood channel timebase based at least in part on the clock information, wherein the coordinated transmission schedule is based at least in part on the network neighborhood channel timebase.

12. The method of claim 1, wherein the coordinated transmission schedule is identified based at least in part on a connection preference for the modified second time division multiple access link.

13. An apparatus for wireless communication at a first wireless device, comprising:
a processor,
memory in electronic communication with the processor; and
instructions stored in the memory and executable by the processor to cause the apparatus to:
receive scheduling information for a first time division multiple access link between a second wireless device and a third wireless device;
identify, based at least in part on the scheduling information for the first time division multiple access link, a coordinated transmission schedule that comprises transmission scheduling information for the first time division multiple access link and a second time division multiple access link between the first wireless device and another wireless device;
establish a third time division multiple access link between the first wireless device and a fourth wireless device based at least in part on the coordinated transmission schedule, wherein the coordinated transmission schedule is identified based at least in part on a connection preference for the third time division multiple access link; and
modify the second time division multiple access link between the first wireless device and the another wireless device based at least in part on the coordinated transmission schedule.

14. The apparatus of claim 13, wherein the instructions are further executable by the processor to cause the apparatus to:
identify one or more link properties associated with the first time division multiple access link, the second time division multiple access link, or both, wherein the coordinated transmission schedule is identified based at least in part on the one or more link properties.

15. The apparatus of claim 13, wherein the instructions are further executable by the processor to cause the apparatus to:
monitor a network neighborhood channel, wherein the scheduling information is received based at least in part on the monitoring.

16. The apparatus of claim 13, wherein the instructions are further executable by the processor to cause the apparatus to:
identify one or more communication periods associated with the first time division multiple access link, the second time division multiple access link, or both; and
identify a scheduling conflict based at least in part on the one or more communication periods, wherein the coordinated transmission schedule is identified based at least in part on the identified scheduling conflict.

17. An apparatus for wireless communication at a first wireless device, comprising:
means for receiving scheduling information for a first time division multiple access link between a second wireless device and a third wireless device;
means for identifying, based at least in part on the scheduling information for the first time division multiple access link, a coordinated transmission schedule that comprises transmission scheduling information for the first time division multiple access link and a second time division multiple access link between the first wireless device and another wireless device;
means for establishing a third time division multiple access link between the first wireless device and a fourth wireless device based at least in part on the coordinated transmission schedule, wherein the coordinated transmission schedule is identified based at least in part on a connection preference for the third time division multiple access link; and means for modifying the second time division multiple access link between the first wireless device and the another wireless device based at least in part on the coordinated transmission schedule.

* * * * *